US012598444B2

(12) United States Patent
Wefers et al.

(10) Patent No.: US 12,598,444 B2
(45) Date of Patent: Apr. 7, 2026

(54) APPARATUS AND METHOD FOR RENDERING A SOUND SCENE USING PIPELINE STAGES

(71) Applicant: Fraunhofer-Gesellschaft zur Foerderung der angewandten Forschung e.V., Munich (DE)

(72) Inventors: Frank Wefers, Erlangen (DE); Simon Schwaer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 286 days.

(21) Appl. No.: 17/940,871

(22) Filed: Sep. 8, 2022

(65) Prior Publication Data

US 2023/0007435 A1 Jan. 5, 2023

Related U.S. Application Data

(63) Continuation of application No. PCT/EP2021/056363, filed on Mar. 12, 2021.

(30) Foreign Application Priority Data

Mar. 13, 2020 (EP) .................................... 20163153

(51) Int. Cl.
*H04S 7/00* (2006.01)

(52) U.S. Cl.
CPC .......... *H04S 7/308* (2013.01); *H04S 2420/01* (2013.01)

(58) Field of Classification Search
None
See application file for complete search history.

(56) References Cited

U.S. PATENT DOCUMENTS 8,437,868 B2 5/2013 Spille et al.
8,488,796 B2 7/2013 Jot et al.
(Continued)

FOREIGN PATENT DOCUMENTS

CN 101673549 A 3/2010
CN 104604257 A 5/2015
(Continued)

OTHER PUBLICATIONS

Nicolas Tsingos et al., Perceptual Audio Rendering of Complex Virtual Environments, 23 ACM Transactions on Graphics 249 (2003) (Year: 2003).*
(Continued)

*Primary Examiner* — Walter F Briney, III
(74) *Attorney, Agent, or Firm* — Perkins Coie LLP; Michael A. Glenn

(57) ABSTRACT

Apparatus for rendering a sound scene, including: a first pipeline stage including a first control layer and a reconfigurable first audio data processor, wherein the reconfigurable first audio data processor is configured to operate in accordance with a first configuration of the reconfigurable first audio data processor; a second pipeline stage located, with respect to a pipeline flow, subsequent to the first pipeline stage, the second pipeline stage including a second control layer and a reconfigurable second audio data processor, wherein the reconfigurable second audio data processor is configured to operate in accordance with a first configuration of the reconfigurable second audio data processor; and a central controller for controlling the first control layer and the second control layer in response to the sound scene, so that the first control layer prepares a second configuration of the reconfigurable first audio data processor during or subsequent to an operation of the reconfigurable first audio data processor in the first configuration of the reconfigurable first
(Continued)

audio data processor, or so that the second control layer prepares a second configuration of the reconfigurable second audio data processor during or subsequent to an operation of the reconfigurable second audio data processor in the first configuration of the reconfigurable second audio data processor, and wherein the central controller is configured to control the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant.

22 Claims, 9 Drawing Sheets

(56) References Cited

U.S. PATENT DOCUMENTS

| | | | | |
|---|---|---|---|---|
| 9,564,138 | B2 | 2/2017 | Oh et al. | |
| 9,711,126 | B2 | 7/2017 | Mehra et al. | |
| 9,940,922 | B1 * | 4/2018 | Schissler | H04S 7/305 |
| 10,075,800 | B2 | 9/2018 | Sladeczek et al. | |
| 10,206,055 | B1 | 2/2019 | Mindlin et al. | |
| 2006/0029243 | A1 | 2/2006 | Gerrard et al. | |
| 2012/0249556 | A1 | 10/2012 | Chandak et al. | |
| 2013/0259115 | A1 | 10/2013 | Stieglitz | |
| 2014/0139738 | A1 | 5/2014 | Mehta et al. | |
| 2014/0161268 | A1 | 6/2014 | Antani et al. | |
| 2015/0365777 | A1 | 12/2015 | Kim | |
| 2015/0378019 | A1 | 12/2015 | Schissler et al. | |
| 2016/0034248 | A1 | 2/2016 | Schissler et al. | |
| 2017/0208417 | A1 | 7/2017 | Thakur et al. | |
| 2017/0324792 | A1 | 11/2017 | Estrop et al. | |
| 2017/0325045 | A1 | 11/2017 | Baek et al. | |
| 2018/0098172 | A1 | 4/2018 | Family et al. | |
| 2018/0295460 | A1 | 10/2018 | Chon et al. | |
| 2018/0359591 | A1 | 12/2018 | Bygrave | |
| 2019/0013031 | A1 | 1/2019 | Disch et al. | |
| 2019/0020968 | A1 | 1/2019 | Suenaga et al. | |
| 2019/0349701 | A1 | 11/2019 | Mehta et al. | |
| 2019/0356999 | A1 | 11/2019 | Raghuvanshi et al. | |
| 2020/0142665 | A1 | 5/2020 | Dantrey et al. | |
| 2020/0142851 | A1 | 5/2020 | Catiller | |
| 2023/0007426 | A1 | 1/2023 | Koppens | |
| 2023/0007427 | A1 * | 1/2023 | Mate | G06F 3/165 |

FOREIGN PATENT DOCUMENTS

| | | | |
|---|---|---|---|
| CN | 108419174 | A | 8/2018 |
| EP | 3090573 | A1 | 11/2016 |
| EP | 3220669 | B1 | 12/2018 |
| EP | 3470976 | A1 | 4/2019 |
| JP | 2003061200 | A | 2/2003 |
| JP | 2017530413 | A | 10/2017 |
| JP | 2019506695 | A | 3/2019 |
| KR | 20170125660 | A | 11/2017 |
| RU | 12523215 | C2 | 7/2014 |
| RU | 2540774 | C2 | 2/2015 |
| RU | 2602346 | C2 | 11/2016 |
| RU | 2646375 | C2 | 3/2018 |
| RU | 2656986 | C1 | 6/2018 |
| RU | 2698775 | C1 | 8/2019 |
| WO | 2010017967 | A1 | 2/2010 |
| WO | 2014036085 | A1 | 3/2014 |
| WO | 2015102920 | A1 | 7/2015 |
| WO | 2015156654 | A1 | 10/2015 |
| WO | 2016054186 | A1 | 4/2016 |
| WO | 2017140949 | A1 | 8/2017 |
| WO | 2019066348 | A1 | 4/2019 |

OTHER PUBLICATIONS

Borish, J., "Extension of the image model to arbitrary polyhedra", The Journal of the Acoustical Society of America 75.6 (1984): 1827-1836, pp. 1827-1836.

Kouyoumjian, et al., "A uniform geometrical theory of diffraction for an edge in a perfectly conducting surface", Proc. of the IEEE, (19740000), vol. 62, No. 11, pp. 1448-1461, XP000605077, 1974, pp. 1448-1461.

Mechel, F. P, "Improved mirror source method in room acoustics", Journal of sound and vibration 256.5 (2002): 873-940, 2002, pp. 873-940.

Savioja, Lauri, et al., "Interpolated rectangular 3-D digital waveguide mesh algorithms with frequency warping", IEEE Trans. Speech Audio Process., (20030000), vol. 11, No. 6, doi:10.1109/TSA.2003.818028, pp. 783-790, XP011104550, pp. 783-790.

Stephenson, U. M, "Analytical derivation of a formula for the reduction of computation time by the voxel crossing technique used in room acoustical simulation", Applied Acoustics 67.10 (2006): 959-981, 2006, pp. 959-981.

Vorländer, Michael, "Simulation of the transient and steady-state sound propagation in rooms using a new combined raytracing/image-source algorithm", The Journal of the Acoustical Society of America, (19890000), vol. 86, No. 1, pp. 172-178, pp. 172-178.

Potard, Guillaume, et al., "Decorrelation Techniques for the Rendering of Apparent Sound Source Width in 3D Audio Displays", Proc. of the 7th Int'l Conference on Digital Audio Effects (DAFx'04), Naples, Italy, pp. 280-284.

Schissler, Carl, et al., "Efficient HRTF-based Spatial Audio for Area and Volumetric Sources", IEEE Transactions on Visualization and Computer Graphics, vol. 22, No. 4, 2016, pp. 1356-1366.

Allen, John B, et al., "Image method for efficiently simulating small-room acoustics", The Journal of the Acoustical Society of America, (19790000), vol. 65, No. 4,pp. 943-950, 1979, pp. 943-950.

Funkhouser, Thomas, et al., "A beam tracing approach to acoustic modeling for interactive virtual environments", Proc. of ACM SIGGRAPH, (19980000), doi:10.1145/280814.280818, pp. 21-32, XP058331794, pp. 21-32.

Krokstad, A., et al., "Calculating the acoustical room response by the use of a ray tracing technique", Journal of Sound and Vibration 8.1 (1968): 118-125, pp. 118-125.

Mehra, Ravish, et al., "Source and listener directivity for interactive wave-based sound propagation", IEEE Transactions on Visualization and Computer Graphics, (20140000), vol. 20, No. 4, doi: 10.1109/TVCG.2014.38, pp. 495-503, XP011543571, pp. 495-503.

Mehra, Ravish, et al., "Wave-based sound propagation in large open scenes using an equivalent source formulation", ACM Trans. on Graphics, (20130000), vol. 32, No. 2,pp. 1-13, pp. 1-13.

Noe, Nicolas, et al., "[Uploaded in 2 parts] Application de l'acoustique géométrique à la simulation de la réflexion et de la diffraction par des surfaces courbes", 10ème Congrès Françaisd'acoustique, (Apr. 16, 2010), pp. 1-7, XP055810825 [A] 1-19 * the whole document, 4 pp.

Noe, Nicolas, et al., "A general ray-tracing solution to reflection on curved surfaces and diffraction by their bounding edges", Theoretical and Computationalacoustics 2009, (Sep. 11, 2009), pp. 225-234, XP055810798 [A] 1-19 * sections 2("Previous work"), 3.3 ("Tesselated geometry"), 3.4 ("Acoustic computations"); figures1 (b), 6, pp. 225-234.

Pharr, Matt, et al., "[Uploaded in 9 parts] Physically Based Rendering", Morgan Kaufmann Publishers Inc. San Francisco, USA, 51 pp.

Raghuvanshi, Nikunj, et al., "Parametric directional coding for precomputed sound propagation", ACM Trans. on Graphics, (20180000), vol. 37, No. 4, pp. 1-14, pp. 1-14.

Savioja, Svensson, et al., "Overview of geometrical room acoustic modelling techniques", The Journal of the Acoustical Society of America 138.2 (2015): 708-730, pp. 708-730.

Schissler, Carl, et al., "High-order diffraction and diffuse reflections for interactive sound propagation in large environments", ACM Transactions on Graphics, ACM, NY,US, (Jul. 27, 2014), vol. 33,

(56) References Cited

OTHER PUBLICATIONS

No. 4, doi: 10.1145/2601097.2601216, ISSN 0730-0301, pp. 1-2, XP058516463 [A] 1-20, pp. 1-12.
Schröeder, "Physically Based Real-Time Auralization of Interactive Virtual Environments", XP055593422, Berlin, Retrieved from the Internet: URL:http://publications.rwth-aachen.de/record/50580/files/3875.pdf [retrieved on Jun. 3, 2019] chapter 5.2.3, Feb. 4, 2011, pp. 1-4.7, 8,19, 20.
Svensson, U. Peter, et al., "An analytic secondary source model of edge diffraction impulse responses", Acoustical Society of America Journal, (19990000), vol. 106, doi:10.1121/1.428071, pp. 2331-2344, XP012001263, 1999, pp. 2331-2344.
Taylor, Micah, et al., "Guided multiview ray tracing for fast auralization", IEEE Transactions on Visualization and Computer Graphics, (20120000), vol. 18, pp. 1797-1810, pp. 1797-1810.
Taylor, Micah T, et al., "Resound: interactive sound rendering for dynamic virtual environments", Proc. of the seventeen ACM international conference on Multimedia, (20090000), pp. 271-280, 2009, pp. 271-280.
Tsingos, Nicolas, et al., "Modeling acoustics in virtual environments using the uniform theory of diffraction", Proc. of the SIGGRAPH, (20010000), doi:10.1145/383259.383323, pp. 545-552, XP058253479, pp. 545-552.
Tsingos, Nicolas, et al., "Perceptual audio rendering of complex virtual environments", ACM Transactions on Graphics (TOG) 23.3 (2004): 249-258, pp. 249-258.
Ucdavis, "Head-Related Transfer Functions", www.ece.ucdavis.edu-cipic-spatia-sound_Head-Related, 2019, 6 pp.
Vorländer, Michael, "[Uploaded in 3 parts] Auralization: fundamentals of acoustics, modelling, simulation, algorithms and acoustic virtual reality", Springer Science & Business Media, 2007, 170 pp.
Wenzel, Elizabeth M, et al., "Sound Lab: A real-time, software-based system for the study of spatial hearing", Audio Engineering Society Convention 108. Audio Engineering Society, 2000, 2000, 27 pp.
Yeh, Hengchin, et al., "Wave-ray coupling for interactive sound propagation in large complex scenes", ACM Trans. Graph., (20130000), vol. 32, No. 6, doi:10.1145/2508363.2508420, pp. 1-11, XP058033914, pp. 1-11.

* cited by examiner

APPARATUS AND METHOD FOR RENDERING A SOUND SCENE USING PIPELINE STAGES

CROSS-REFERENCES TO RELATED APPLICATIONS

This application is a continuation of copending International Application No. PCT/EP2021/056363, filed Mar. 12, 2021, which is incorporated herein by reference in its entirety, and additionally claims priority from European Application No. EP 20 163 153.8, filed Mar. 13, 2020, which is incorporated herein by reference in its entirety.

BACKGROUND OF THE INVENTION

The present invention relates to audio processing and, particularly, to audio signal processing of sound scenes occurring, for example, in virtual reality or augmented reality applications.

Geometrical Acoustics are applied in auralization, i.e., real-time and offline audio rendering of auditory scenes and environments. This includes Virtual Reality (VR) and Augmented Reality (AR) systems like the MPEG-I 6-DoF audio renderer. For rendering complex audio scenes with six degrees of freedom (DoF), the field of Geometrical Acoustics is applied, where the propagation of sound data is modeled using methods known from optics such as ray-tracing. Particularly, the reflections at walls are modeled based on models derived from optics, in which the angle of incidence of a ray that is reflected at the wall results in a reflection angle being equal to the angle of incidence.

Real-time auralization systems, like the audio renderer in a Virtual Reality (VR) or Augmented Reality (AR) system, usually render early reflections based on geometry data of the reflective environment. A Geometrical Acoustics method like the image source method in combination with ray-tracing is then used to find valid propagation paths of the reflected sound. These methods are valid, if the reflecting planar surfaces are large compared to the wave length of incident sound. The distance of the reflection point on the surface to the boundaries of the reflecting surface also has to be large compared to the wave length of incident sound.

Sound in Virtual Reality (VR) and Augmented Reality (AR) is rendered for a listener (user). The inputs to this process are (typically anechoic) audio signals of sound sources. A multitude of signal processing techniques is then applied to these input signals, simulating and incorporating relevant acoustic effects such as sound transmission through walls/windows/doors, diffraction around and occlusion by solid or permeable structures, the propagation of sound over longer distances, reflections in half-open and enclosed environments, Doppler shifts of moving sources/listeners, etc. The output of the audio rendering are audio signals that create a realistic, three-dimensional acoustic impression of the presented VR/AR scene when delivered to the listener via headphones or loudspeakers.

The rendering is performed listener-centric and the system has to react to user motion and interaction instantaneously, without significant delays. Hence the processing of the audio signals has to be performed in real-time. User input manifests in changes of the signal processing (e.g., different filters). These changes are to be incorporated in the rendering without audible artifacts.

Most audio renderers used a pre-defined fixed signal processing structure (block diagram applied to multiple channels, see for example [1]) with a fixed computation time budget for each individual audio source (e.g. 16× object source, 2× third-order Ambisonics). These solutions enable rendering dynamic scenes, by updating location-dependent filters and reverb parameters, but they do not allow for sources to be dynamically added/removed during runtime.

Moreover, a fixed signal processing architecture can be rather ineffective when rendering complex scenes, as a large number of sources has to be processed in the same way. Newer rendering concepts facilitate clustering and level-of-detail concepts (LOD), where, depending on the perception, sources are combined and rendered with different signal processing. Source clustering (see [2]) can enable renderers to handle complex scenes with hundreds of objects. In such a setup, the cluster budget is still fixed which may lead to audible artifacts of extensive clustering in complex scenes.

SUMMARY

According to an embodiment, an apparatus for rendering a sound scene may have a first pipeline stage including a first control layer and a reconfigurable first audio data processor, wherein the reconfigurable first audio data processor is configured to operate in accordance with a first configuration of the reconfigurable first audio data processor; a second pipeline stage located, with respect to a pipeline flow, subsequent to the first pipeline stage, the second pipeline stage including a second control layer and a reconfigurable second audio data processor, wherein the reconfigurable second audio data processor is configured to operate in accordance with a first configuration of the reconfigurable second audio data processor; and a central controller for controlling the first control layer and the second control layer in response to the sound scene, so that the first control layer prepares a second configuration of the reconfigurable first audio data processor during or subsequent to an operation of the reconfigurable first audio data processor in the first configuration of the reconfigurable first audio data processor, or so that the second control layer prepares a second configuration of the reconfigurable second audio data processor during or subsequent to an operation of the reconfigurable second audio data processor in the first configuration of the reconfigurable second audio data processor, and wherein the central controller is configured to control the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant.

Another embodiment may have a method of rendering a sound scene using an apparatus including a first pipeline stage including a first control layer and a reconfigurable first audio data processor, wherein the reconfigurable first audio data processor is configured to operate in accordance with a first configuration of the reconfigurable first audio data processor; a second pipeline stage located, with respect to a pipeline flow, subsequent to the first pipeline stage, the second pipeline stage including a second control layer and a reconfigurable second audio data processor, wherein the reconfigurable second audio data processor is configured to operate in accordance with a first configuration of the reconfigurable second audio data processor, the method having the steps of: controlling the first control layer and the second control layer in response to the sound scene, so that the first control layer prepares a second configuration of the reconfigurable first audio data processor during or subsequent to an operation of the reconfigurable first audio data processor in the first configuration of the reconfigurable first audio data processor, or so that the second control layer prepares a second configuration of the reconfigurable second audio data processor during or subsequent to an operation of the reconfigurable second audio data processor in the first configuration of the reconfigurable second audio data processor, and controlling the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant.

Another embodiment may have a non-transitory digital storage medium having a computer program stored thereon to perform the method of rendering a sound scene using an apparatus including a first pipeline stage including a first control layer and a reconfigurable first audio data processor, wherein the reconfigurable first audio data processor is configured to operate in accordance with a first configuration of the reconfigurable first audio data processor; a second pipeline stage located, with respect to a pipeline flow, subsequent to the first pipeline stage, the second pipeline stage including a second control layer and a reconfigurable second audio data processor, wherein the reconfigurable second audio data processor is configured to operate in accordance with a first configuration of the reconfigurable second audio data processor, the method having the steps of: controlling the first control layer and the second control layer in response to the sound scene, so that the first control layer prepares a second configuration of the reconfigurable first audio data processor during or subsequent to an operation of the reconfigurable first audio data processor in the first configuration of the reconfigurable first audio data processor, or so that the second control layer prepares a second configuration of the reconfigurable second audio data processor during or subsequent to an operation of the reconfigurable second audio data processor in the first configuration of the reconfigurable second audio data processor, and controlling the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant, when said computer program is run by a computer.

The present invention is based on the finding that, for the purpose of rendering a complex sound scene with many sources in an environment, where frequent changes of the sound scene can occur, a pipeline-like rendering architecture is useful. The pipeline-like rendering architecture comprises a first pipeline stage comprising a first control layer and a reconfigurable first audio data processor. Furthermore a second pipeline stage that is located, with respect to a pipeline flow, subsequent to the first pipeline stage is provided.

This second pipeline stage again comprises a second control layer and a reconfigurable second audio data processor. Both the first and the second pipeline stages are configured to operate in accordance with a certain configuration of the reconfigurable first audio data processor at a certain time in the processing. In order to control the pipeline-architecture, a central controller for controlling the first control layer and the second control layer is provided. The control takes place in response to the sound scene, i.e., in response to an original sound scene or a change of the sound scene.

In order to achieve a synchronized operation of the apparatus among all pipeline stages, and when a reconfiguration task for the first or the second reconfigurable audio data processor is required, the central controller controls the control layers of the pipeline stages so that the first control layer or the second control layer prepares another configuration such as a second configuration of the first or the second reconfigurable audio data processor during or subsequent to an operation of the reconfigurable audio data processor in the first configuration. Hence, a new configuration for the reconfigurable first or second audio data processor is prepared while the reconfigurable audio data processor belonging to this pipeline stage is still operating in accordance with a different configuration or is configured in a different configuration in case the processing task with the earlier configuration is already done. In order to make sure that both pipeline stages operate synchronized in order to obtain the so-called "atomic operation" or "atomic updates", the central controller controls the first and the second control layers using a switch control to reconfigure the reconfigurable first audio data processor or the reconfigurable second audio data processor to the second different configuration at a certain time instant. Even when only a single pipeline stage is reconfigured, embodiments of the present invention nevertheless guarantee that due to the switch control at the certain time instance, the correct audio sample data is processed in the audio workflow via the provision of the audio stream input or output buffers included in the corresponding render lists.

Advantageously, the apparatus for rendering the sound scene has a higher number of pipeline stages than a first and a second pipeline stage, but already in a system with a first and a second pipeline stage and no additional pipeline stage, the synchronized switching of the pipeline stages in response to the switch control is necessary for obtaining an improved high quality audio rendering operation that, at the same time, is highly flexible.

In particular, in complex virtual reality scenes, where a user can move in three directions and where, additionally, the user can move her or his head in three additional directions, i.e., in a six degrees of freedom (6-DoF) scenario, frequent and sudden changes of filters in the rendering pipeline, for example for switching from one head-related transfer function to another head-related transfer function in case of the moving of the listener's head or the walking around of the listener requires such a change of head-related transfer functions will take place.

Other problematic situations with respect to a flexible rendering with high quality are that when a listener moves around in a virtual or augmented reality scene, the number of sources to be rendered will change all the time. This can for example occur due to the fact that certain image sources become visible at a certain position of the user or due to the fact that additional diffraction effects have to be considered. Furthermore, other procedures are that in certain situations, a clustering of many different closely spaced sources is possible while, when the user moves closer to these sources, then the clustering is not feasible anymore, since the user is so close that it is necessary that each source is rendered at its distinct position. Thus, such audio scenes are problematic in that changing filters or a changing number of sources to be rendered or, in general, changing parameters is required all the time. On the other hand, it is useful to distribute the different operations for rendering onto different pipeline stages so that an efficient and high speed rendering is possible, in order to make sure that a real time rendering in complex audio environments is achievable.

A further example for a thoroughly changing parameter is that as soon as a user comes closer to a source or an image source, the frequency-dependent distance attenuation and propagation delay changes with the distance between the user and sound source. Similarly, the frequency-dependent characteristics of the reflective surface may change depending on the configuration between the user and a reflecting object. Furthermore, depending on whether a user is close to a diffracting object or further away from the diffracting object or at a different angle, the frequency-dependent diffraction characteristics will also change. Thus, if all these tasks are distributed to different pipeline stages, continuing changes of these pipeline stages have to be possible and have to be performed synchronously. All this is achieved by means of the central controller that controls the control layers of the pipeline stages to prepare for a new configuration during or subsequent to an operation of the corresponding configurable audio data processor in the earlier configuration. In response to a switch control for all stages in the pipeline effected by a control update via the switch control, the reconfiguration takes place a certain time instant being identical or being at least very similar among the pipeline stages in the apparatus for rendering the sound scene.

The present invention is advantageous since it allows a high quality real-time auralization of auditory scenes with dynamically changing elements, for example moving sources and listeners. Thus, the present invention contributes to the achievement of perceptually convincing soundscapes that are a significant factor for the immersive experience of a virtual scene.

Embodiments of the present invention apply separate and concurrent workflows, threads or processes that very well fit to the situation of rendering dynamic auditory scenes.

1. The interaction workflow: handling of changes in the virtual scene (e.g., user motion, user interaction, scene animations, etc.) that occur at arbitrary points in time.
2. the control workflow: a snapshot of the current state of the virtual scene results in updates of the signal processing and its parameters.
3. the processing workflow: execution of the real-time signal processing, i.e., taking a frame of input samples and computing the corresponding frame of output samples.

Executions of the control workflow vary in run time, depending on which necessary computations a change is triggered, similar to the frame loop in visual computing. Advantageous embodiments of the invention are advantageous in that such variations of executions of the control workflow do not at all adversely affect the processing workflow, which is concurrently executed in the background. As real-time audio is processed block-wise, the acceptable computation time of the processing workflow is typically limited to usually a few milliseconds.

The processing workflow that is concurrently executed in the background is processed by the first and the second reconfigurable audio data processors, and the control workflow is initiated by the central controller and is then implemented, on the pipeline stage level, by the control layers of the pipeline stages parallel to the background operation of the processing workflow. The interaction workflow is implemented, on the pipelined rendering apparatus level, by an interface of the central controller to external devices such as a head tracker or a similar device or is controlled by the audio scene having a moving source or geometry that represents a change of the sound scene as well as a change in the user orientation or location, i.e., generally in the user position.

The present invention is advantageous in that multiple objects in the scene can be changed coherently and sample synchronously due to the centrally controlled switch control procedure. Furthermore, this procedure allows so-called atomic updates of multiple elements that have to be supported by the control workflow and the processing workflow in order to not interrupt the audio processing due to changes on the highest level, i.e., in the interaction workflow or in the intermediate level, i.e., the control workflow.

Advantageous embodiments of the present invention relate to the apparatus for rendering the sound scene implementing a modular audio rendering pipeline, where the necessary steps for auralization of virtual auditory scenes are partitioned into several stages which are each independently responsible for certain perceptual effects. The individual partitioning into at least two or advantageously even more individual pipeline stages depends on the application and is advantageously defined by the author of the rendering system as is illustrated later.

The present invention provides a generic structure for the rendering pipeline that facilitates parallel processing and dynamic reconfiguration of the signal processing parameters depending on the current state of the virtual scene. In that process, embodiments of the present invention ensure a) that each stage can change their DSP processing dynamically (e.g., number of channels, updated filter coefficients) without producing audible artifacts and that any update of the rendering pipeline, based on recent changes in the scene, is handled synchronously and atomically if required
b) that changes in the scene (e.g., listener movement) can be received at arbitrary points in time and do not influence the real-time performance of the system and particularly the DSP processing, and
c) that individual stages can profit from the functionality of other stages in the pipeline (e.g., a unified directivity rendering for primary and image sources or opaque clustering for complexity reduction).

BRIEF DESCRIPTION OF THE DRAWINGS

Embodiments of the present invention will be detailed subsequently referring to the appended drawings, in which.

DETAILED DESCRIPTION OF THE INVENTION

Figure 5:
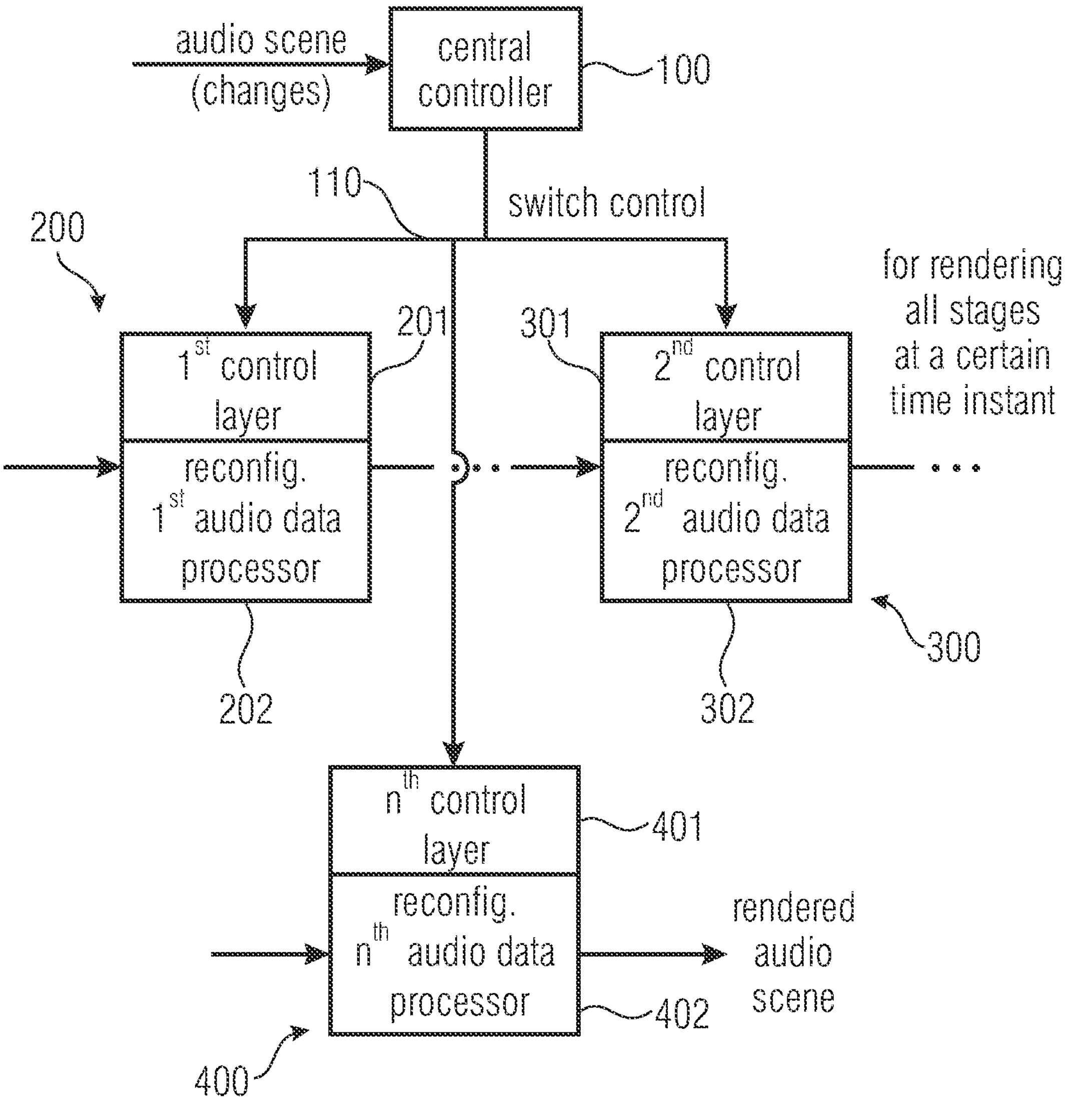
FIG. 5 illustrates a advantageous implementation of the apparatus for rendering a sound scene.

FIG. 5 illustrates an apparatus for rendering a sound scene or audio scene received by a central controller 100. The apparatus comprises a first pipeline stage 200 with a first control layer 201 and a reconfigurable first audio data processor 202. Furthermore, the apparatus comprises a second pipeline stage 300 located, with respect to a pipeline flow, subsequent to the first pipeline stage 200. The second pipeline stage 300 can be placed immediately following the first pipeline stage 200 or can be placed with one or more pipeline stages in between the pipeline stage 300 and the pipeline stage 200. The second pipeline stage 300 comprises a second control layer 301 and a reconfigurable second audio data processor 302. Furthermore, an optional n-th pipeline stage 400 is illustrated that comprises an n-th control layer 401 and the reconfigurable n-th audio data processor 402. In the exemplary embodiment in FIG. 5, the result of the pipeline stage 400 is the already rendered audio scene, i.e., the result of the whole processing of the audio scene or the audio scene changes that have arrived at the central controller 100. The central controller 100 is configured for controlling the first control layer 201 and the second control layer 301 in response to the sound scene.

In response to the sound scene means in response to a whole scene input at a certain initialization or beginning time instant or in response to sound scene changes that, together with a preceding scene existing before the sound scene changes again, represent a full sound scene that is to be processed by the central controller 100. In particular, the central controller 100 controls the first and the second control layers and if available, any other control layers such the n-th control layer 401 so that a new or second configuration of the first, the second and/or the n-th reconfigurable audio data processor is prepared while the corresponding reconfigurable audio data processor operates in the background in accordance with an earlier or first configuration. For this background mode, it is not decisive whether the reconfigurable audio data processor still operates, i.e., receives input samples and calculates output samples. Instead, it can also be the situation that a certain pipeline stage has already completed its tasks. Thus, the preparation of the new configuration takes place during or subsequent to an operation of the corresponding reconfigurable audio data processor in the earlier configuration.

In order to make sure that atomic updates of the individual pipeline stages 200, 300, 400 are possible, the central controller outputs a switch control 110 in order to reconfigure the individual reconfigurable first or second audio data processors at a certain time instant. Depending on the specific application or sound scene change, only a single pipeline stage can be reconfigured at the certain time instant or two pipeline stages such as pipeline stages 200, 300 are both reconfigured at the certain time instant or all pipeline stages of the whole apparatus for rendering the sound scene or only a subgroup having more than two pipeline stages but less than all pipeline stages can also be provided with the switch control to be reconfigured at the certain time instant. To this end, the central controller 100 has a control line to each control layer of the corresponding pipeline stage in addition to the processing workflow connection serially connecting the pipeline stages. Furthermore, the control workflow connection that is discussed later can either be provided also via the first structure for the central switch control 110. In advantageous embodiments, however, the control workflow is also performed via the serial connection among the pipeline stages so that the central connection between each control layer of the individual pipeline stage and the central controller 100 is only reserved for the switch control 110 to obtain atomic updates and, therefore, a correct and high quality audio rendering even in complex environments.

Figure 1:
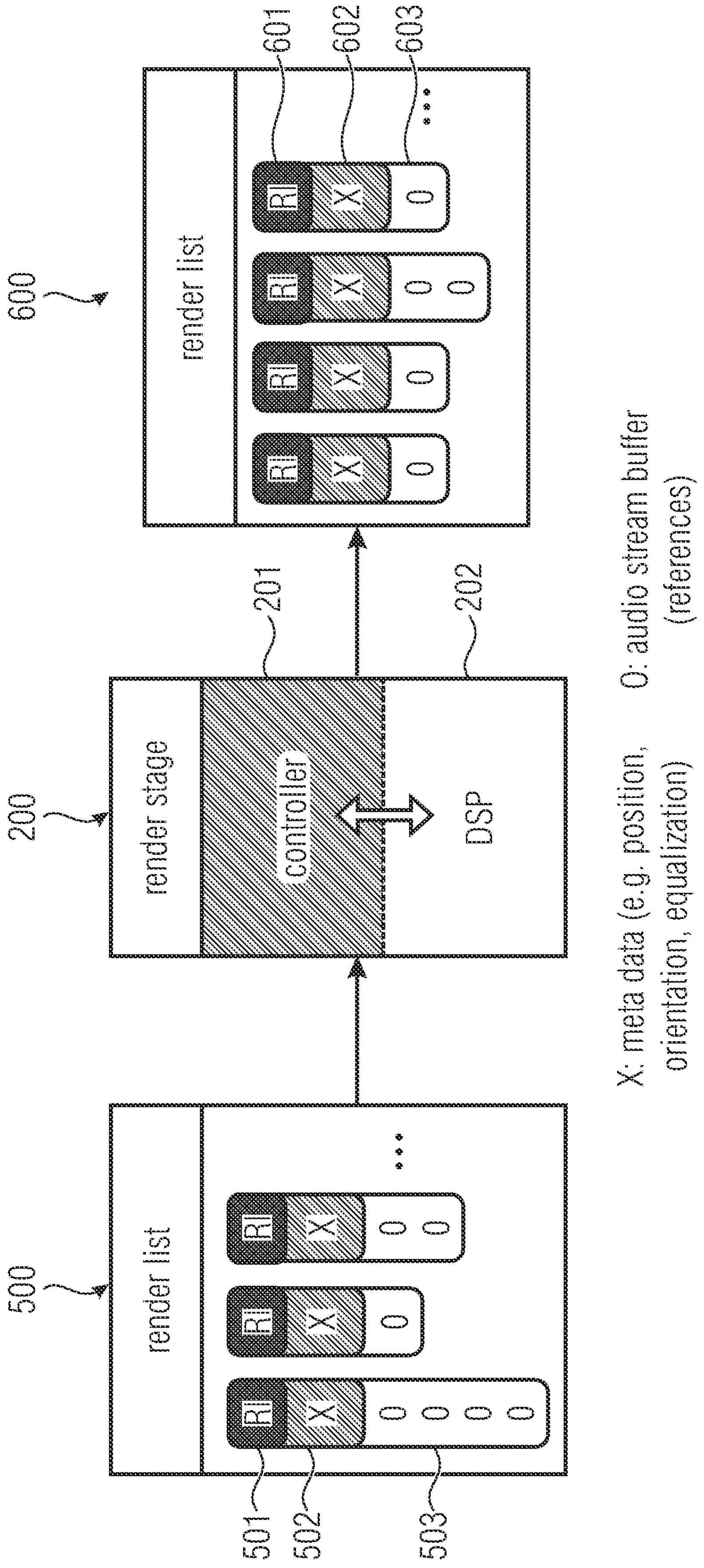
FIG. 1 illustrates a render stage input/output illustration.

The following section describes a general audio rendering pipeline, composed of independent render stages, each with separated, synchronized control and processing workflows (FIG. 1). A superordinate controller ensures that all stages in the pipeline can be updated together atomically.

Every render stage has a control part and a processing part with separate inputs and outputs corresponding to the control and processing workflow respectively. In the pipeline, the outputs of one render stage are the inputs of a succeeding render stage, while a common interface guarantees that render stages can be reorganized and replaced, depending on the application.

This common interface is described as a flat list of render items that is provided to the render stage in the control workflow. A render item combines processing instructions (i.e., metadata, such as position, orientation, equalization, etc.) with an audio stream buffer (single- or multichannel). The mapping of buffers to render items is arbitrary, such that multiple render items can refer to the same buffer.

Every render stage ensures that succeeding stages can read the correct audio samples from the audio stream buffers corresponding to the connected render items at the rate of the processing workflow. To achieve this, every render stage creates a processing diagram from the information in the render items that describes the necessary DSP steps and its input and output buffers. Additional data may be required to construct the processing diagram (e.g., geometry in the scene or personalized HRIR sets) and is provided by the controller. The processing diagrams are lined up for synchronization and handed over to the processing workflow simultaneously for all render stages, after the control update is propagated through the whole pipeline. The exchange of processing diagrams is triggered without interfering with the real-time audio block rate, while the individual stages have to guarantee that no audible artifacts occur due to the exchange. If a render stage only acts on metadata, the DSP workflow can be a no-operation.

The controller maintains a list of render items corresponding to actual audio sources in the virtual scene. In the control workflow, the controller starts a new control update by passing a new list of render items to the first render stage, atomically cumulating all metadata changes resulting from user interaction and other changes in the virtual scene. Control updates are triggered at a fixed rate that may depend on the available computational resources, but only after the previous update is finished. A render stage creates a new list of output render items from the input list. In that process, it can modify existing metadata (e.g., add an equalization characteristic), as well as add new and deactivate or remove existing render items. Render items follow a defined life cycle (FIG. 2) that is communicated via a state indicator on each render item (e.g., “activate”, “deactivate”, “active”, “inactive”). This allows subsequent render stages to update their DSP diagrams according to newly created or obsolete render items. Artifact-free fade-in and fade-out of the render items on state change are handled by the controller.

In a real-time application, the processing workflow is triggered by the callback from the audio hardware. When a new block of samples is requested, the controller fills the buffers of the render items it maintains with input samples (e.g., from disk or from incoming audio streams). The controller then triggers the processing part of the render stages sequentially, which act on the audio stream buffers according to their current processing diagrams.

The render pipeline may contain one or more spatializers (FIG. 3) that are similar to a render stage, but the output of their processing part is a mixed representation of the whole virtual auditory scene as described by the final list of render items and can directly be played over a specified playback method (e.g., binaural over headphones or multichannel loudspeaker setups). However, additional render stages may follow after a spatializer (e.g., for limiting the dynamic range of the output signal).

Advantages of the Proposed Solution

Compared to the state of the art, the inventive audio rendering pipeline can handle highly dynamic scenes with the flexibility to adapt processing to different hardware or user requirements. In this section, several advances over established methods are listed.

- New audio elements can be added to and removed from the virtual scene at runtime. Similarly, render stages can dynamically adjust the level of detail of their rendering based on available computational resources and perceptual requirements.
- Depending on the application, render stages can be reordered or new render stages can be inserted at arbitrary positions in the pipeline (e.g., a clustering or visualization stage) without changing other parts of the software. Individual render stage implementations can be changed without having to change other render stages.
- Multiple spatializers can share a common processing pipeline, enabling for example multi-user VR setups or headphone and loudspeaker rendering in parallel with minimal computational effort.
- Changes in the virtual scene (for example caused by a high-rate head-tracking device) are cumulated with a dynamically adjustable control rate, reducing the computational effort, e.g., for filter switching. At the same time, scene updates that explicitly require atomicity (e.g., parallel movement of audio sources) are guaranteed to be executed at the same time across all render stages.
- The control and processing rate can be adjusted separately, based on the requirements of the user and (audio playback) hardware.

Example

A practical example for a rendering pipeline to create virtual acoustic environments for VR applications may contain the following render stages in the given order (see also FIG. 4):

1. Transmission: Reducing a complex scene with multiple adjoint subspaces by downmixing signals and reverb of distant parts from the listener into a single render item (possibly with spatial extent).
   Processing part: Downmix of signals into combined audio stream buffers and processing the audio samples with established techniques for creating late reverb
2. Extent: Rendering the perceptual effect of spatially extended sound sources by creating multiple, spatially disjunct render items.
   Processing part: distribution of the input audio signal to several buffers for the new render items (possibly with additional processing like decorrelation)
3. Early Reflections: Incorporating perceptually relevant geometric reflections on surfaces by creating representative render items with corresponding equalization and position metadata.
   Processing part: distribution of the input audio signal to several buffers for the new render items
4. Clustering: Combining multiple render items with perceptually indistinguishable positions into a single render item to reduce the computational complexity for subsequent stages.
   Processing part: Downmix of signals into combined audio stream buffers
5. Diffraction: Adding perceptual effects of occlusion and diffraction of propagation paths by geometry.
6. Propagation: Rendering perceptual effects on the propagation path (e.g., direction-dependent radiation characteristics, medium absorption, propagation delay, etc.)
   Processing part: filtering, fractional delay lines, etc.
7. Binaural Spatializer: Rendering the remaining render items to a listener-centric binaural sound output.
   Processing part: HRIR filtering, downmixing, etc.

Subsequently, FIGS. 1 to 4 are described in other words. FIG. 1 illustrates, for example, the first pipeline stage 200 also termed to be a "render stage" that comprises the control layer 201 indicated as "controller" in FIG. 1 and the reconfigurable first audio data processor 202 indicated to be a "DSP" (digital signal processor). The pipeline stage or render stage 200 in FIG. 1 can, however, also be considered to be the second pipeline stage 300 of FIG. 1 or the n-th pipeline stage 400 of FIG. 5.

The pipeline stage 200 receives, as an input via an input interface, an input render list 500 and outputs, via an output interface, an output render list 600. In case of a directly subsequent connection of the second pipeline stage 300 in FIG. 5, the input render list for the second pipeline stage 300 will then be the output render list 600 of the first pipeline stage 200, since the pipeline stages are serially connected to for the pipeline flow.

Each render list 500 comprises a selection of render items illustrated by a column in the input render list 500 or the output render list 600. Each render item comprises a render item identifier 501, render item metadata 502 indicated as "x" in FIG. 1, and one or more audio stream buffers depending on how many audio objects or individual audio streams belong to the render item. The audio stream buffers are indicated by "0" and are advantageously implemented by memory references to actual physical buffers in a wording memory part of the apparatus for rendering the sound scene that can, for example, be managed by the central controller or can be managed in any other way of memory management.

Alternatively, the render list can comprise audio stream buffers representing physical memory portions, but it is advantageous to implement the audio stream buffers 503 as said references to a certain physical memory.

Similarly, the output render list 600 again has one column for each render item and the corresponding render item is identified by a render item identification 601, corresponding metadata 602 and audio stream buffers 603. Metadata 502 or 602 for the render items can comprise a position of a source, a type of a source, an equalizer associated with a certain source or, generally, a frequency-selective behavior associated with a certain source. Thus, the pipeline stage 200 receives, as an input, the input render list 500 and generates, as an output, the output render list 600. Within the DSP 202, audio sample values identified by the corresponding audio stream buffers are processed as required by the corresponding configuration of the reconfigurable audio data processor 202, for example as indicated by a certain processing diagram generated by the control layer 201 for the digital signal processor 202. Since the input render list 500 comprises, for example, three render items, and the output render list 600 comprises, for example, four render items, i.e., more render items than the input, the pipeline stage 202 could perform an upmix, for example. Another implementation could, for example, be that the first render item with the four audio signals is downmixed into a render item with a single channel. The second render item could be left untouched by the processing, i.e., could, for example, be only copied from the input to the output, and the third render item could also be, for example, left untouched by the render stage. Only the last output render item in the output render list 600 could be generated by the DSP, for example, by combining the second and the third render items of the input render list 500 into a single output audio stream for the corresponding audio stream buffer for the fourth render item of the output render list.

Figure 2:
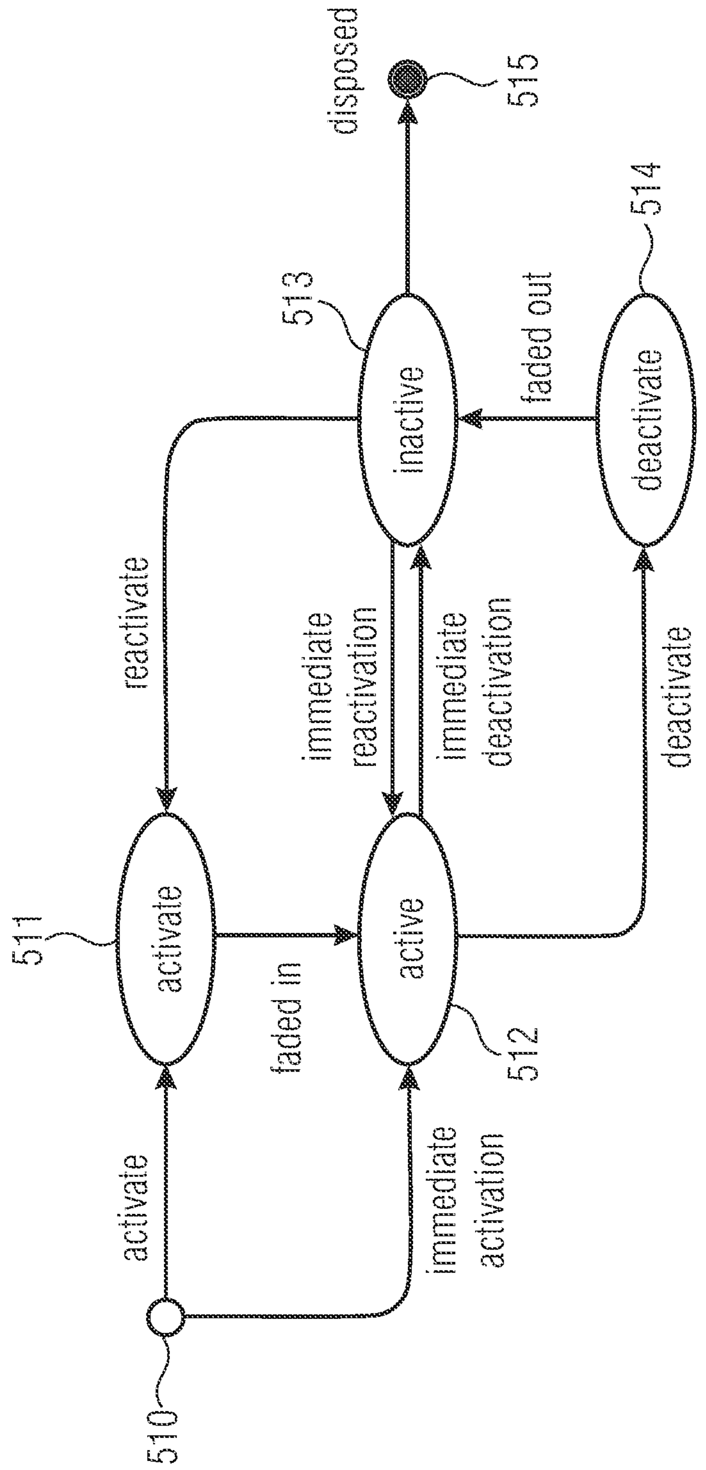
FIG. 2 illustrates a state transition of render items.

FIG. 2 illustrates a state diagram for defining the "live" of a render item. It is advantageous that the corresponding state of the state diagram is also stored in the metadata 502 of the render item or in the identification field of the render item. In start node 510, two different ways of activation can be performed. One way is a normal activation in order to come to an activate state 511. The other way is an immediate activation procedure in order to already arrive at the active state 512. The difference between both procedures is that from the activate state 511 to the active state 512, a fade in procedure is performed.

If a render item is active, it is processed and it can be either immediately deactivated or normally deactivated. In the latter case, a deactivate state 514 is obtained and a fade out procedure is performed in order to come from the deactivate state 514 to the inactive state 513. In case of an immediate deactivation, a direct transition from state 512 to state 513 is performed. The inactive state can either come back to an immediate reactivation or into a reactivate instruction in order to arrive at the activate state 511 or, if neither a reactivate control nor an immediate reactivation control is obtained, control can proceed to the disposed output node 515.

Figure 3:
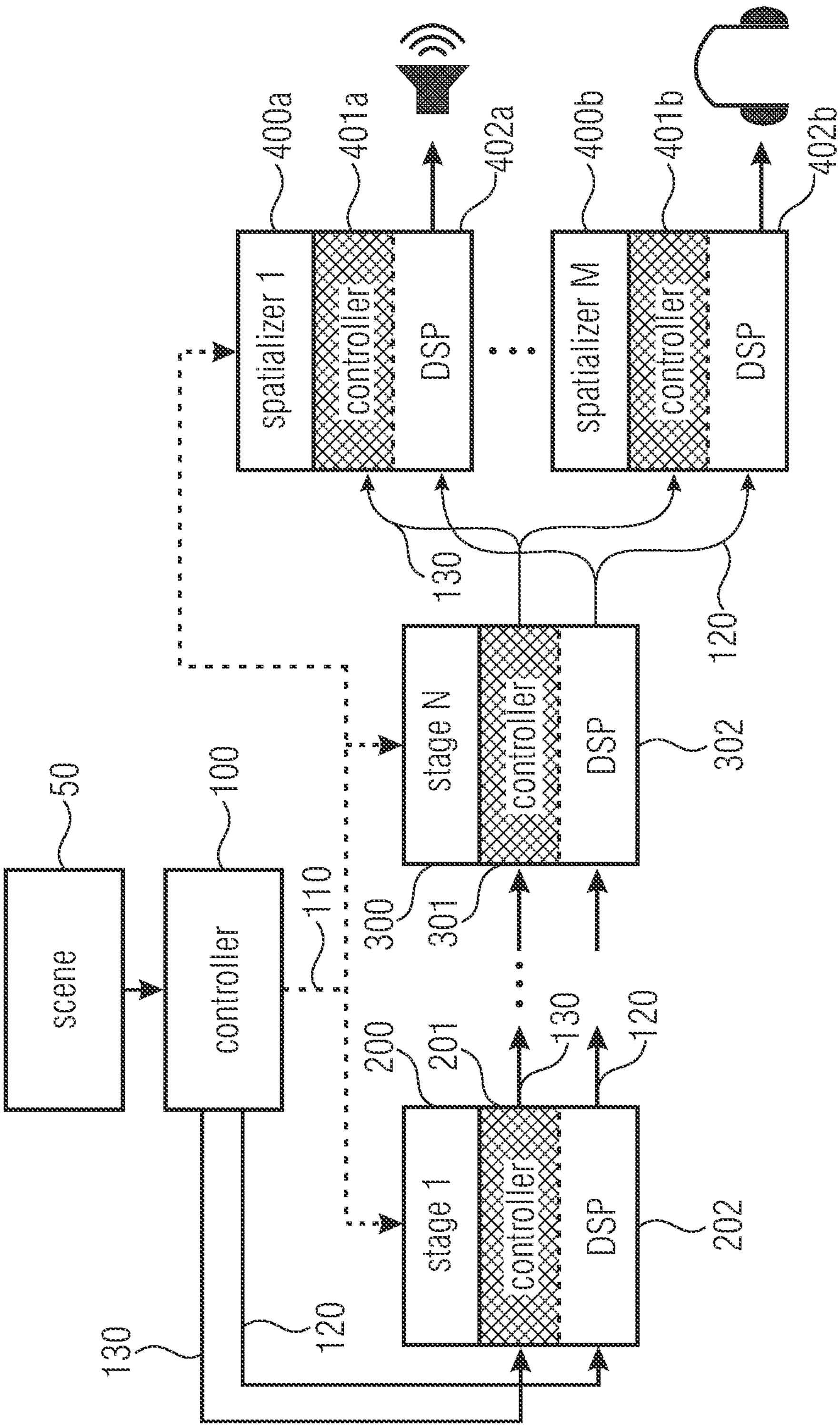
FIG. 3 illustrates a render pipeline overview.

FIG. 3 illustrates a render pipeline overview where the audio scene is illustrated at block 50 and where the individual control flows are illustrated as well. The central switch control flow is illustrated at 110. The control workflow 130 is illustrated to take place from the controller 100 into the first stage 200 and, from there, via the corresponding serial control workflow line 120. Thus, FIG. 3 illustrates the implementation where the control workflow is also fed in into the start stage of the pipeline and is, from there, propagated in a serial manner to the last stage. Similarly, the processing workflow 120 starts from the controller 120 via the reconfigurable audio data processors of the individual pipeline stages into the final stages where FIG. 3 illustrates two final stages, one loudspeaker output stage or specializer one stage 400*a* or a headphone specializer output stage 400*b*.

Figure 4:
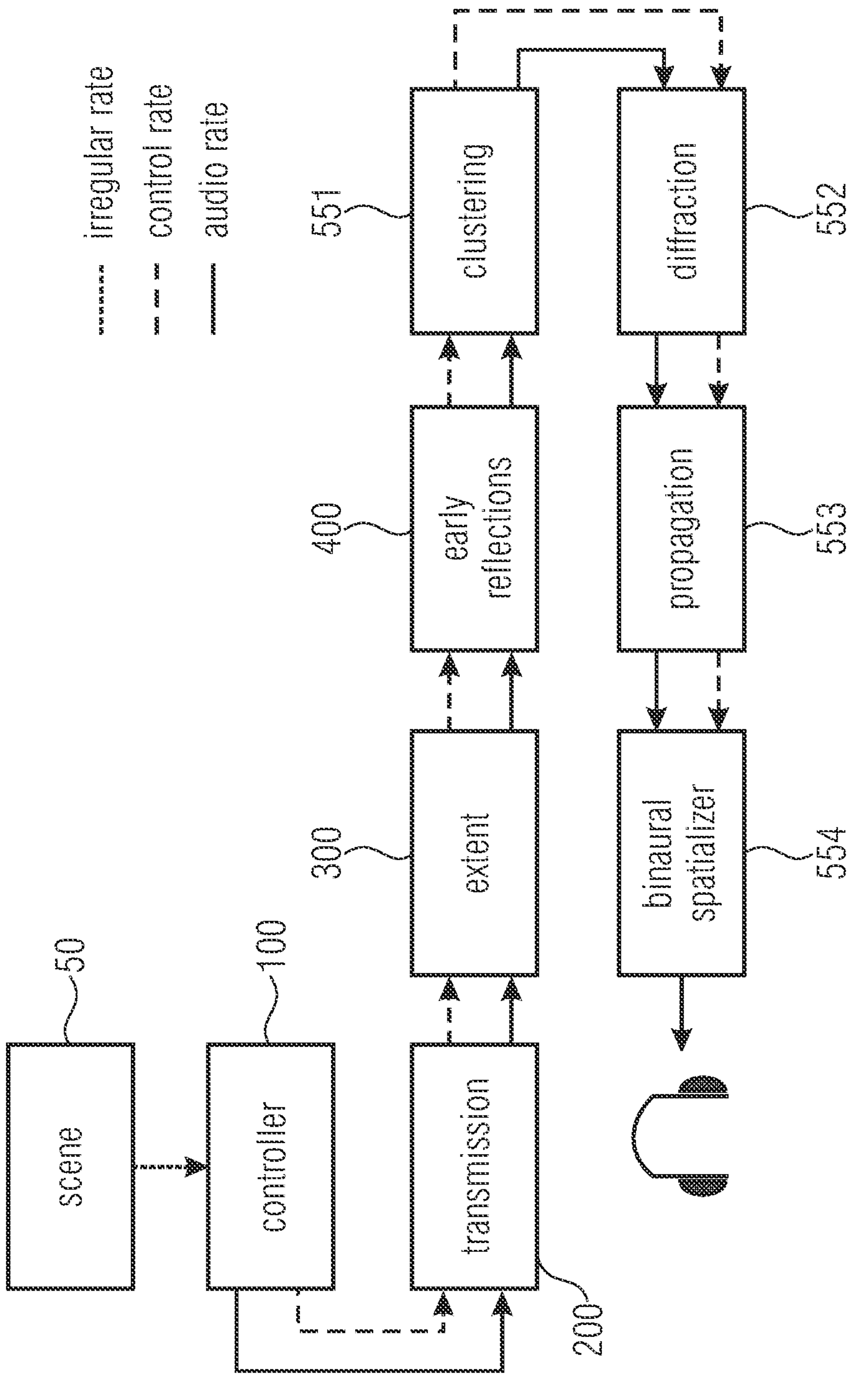
FIG. 4 illustrates an example structure for a virtual reality auralization pipeline.

FIG. 4 illustrates an exemplary virtual reality rendering pipeline having the audio scene representation 50, the controller 100 and, as the first pipeline stage, a transmission pipeline stage 200. The second pipeline stage 300 is implemented as an extent render stage. A third pipeline stage 400 is implemented as an early reflection pipeline stage. A fourth pipeline stage is implemented as a clustering pipeline stage 551. A fifth pipeline stage is implemented as a diffraction pipeline stage 552. A sixth pipeline stage is implemented as a propagation pipeline stage 553, and a final seventh pipeline stage 554 is implemented as a binaural spatializer in order to finally obtain headphone signals for a headphone to be worn by a listener navigating in the virtual reality or augmented reality audio scene.

Figure 6:
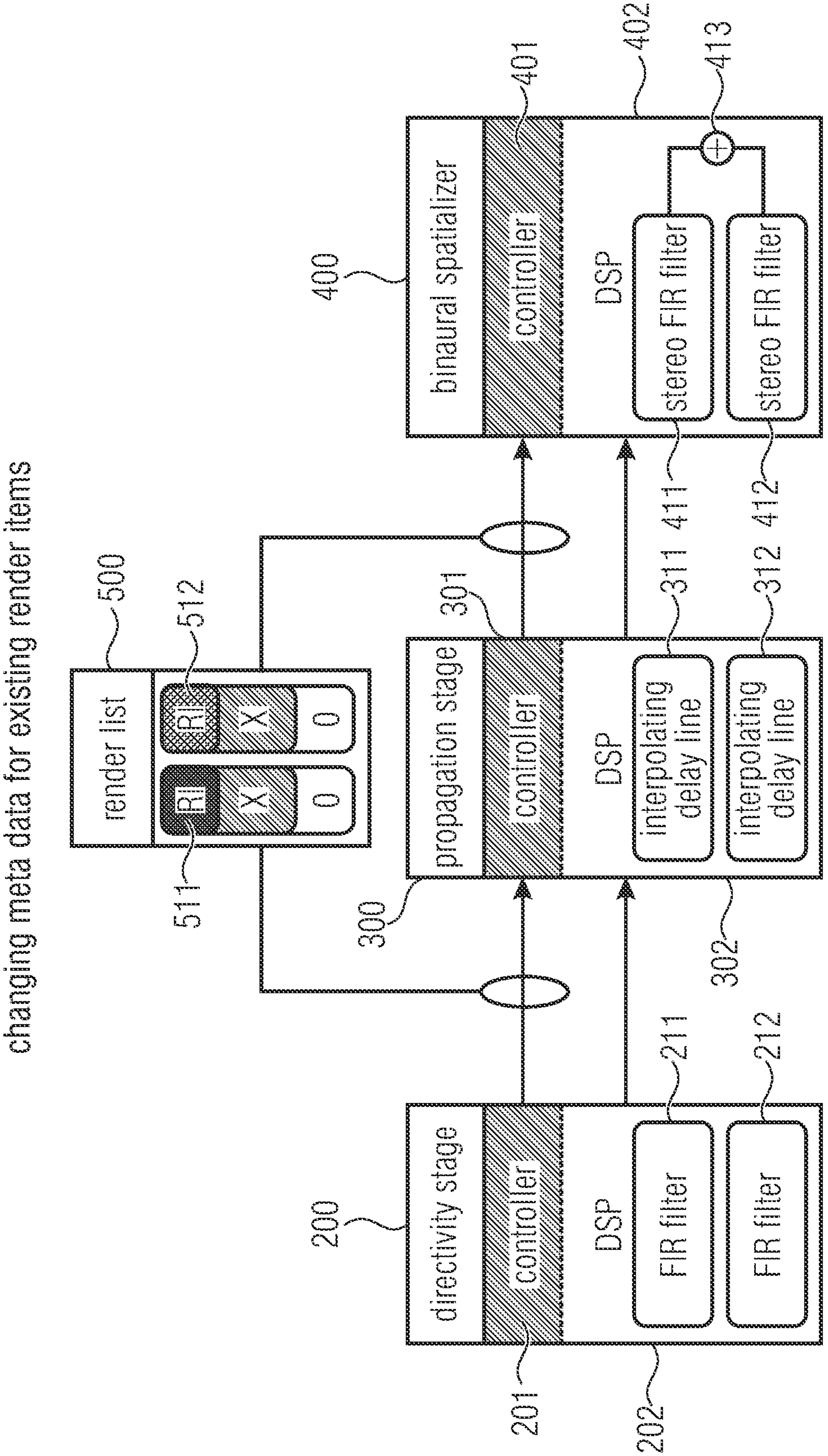
FIG. 6 illustrates an example implementation for changing metadata for existing render items.
Figure 7:
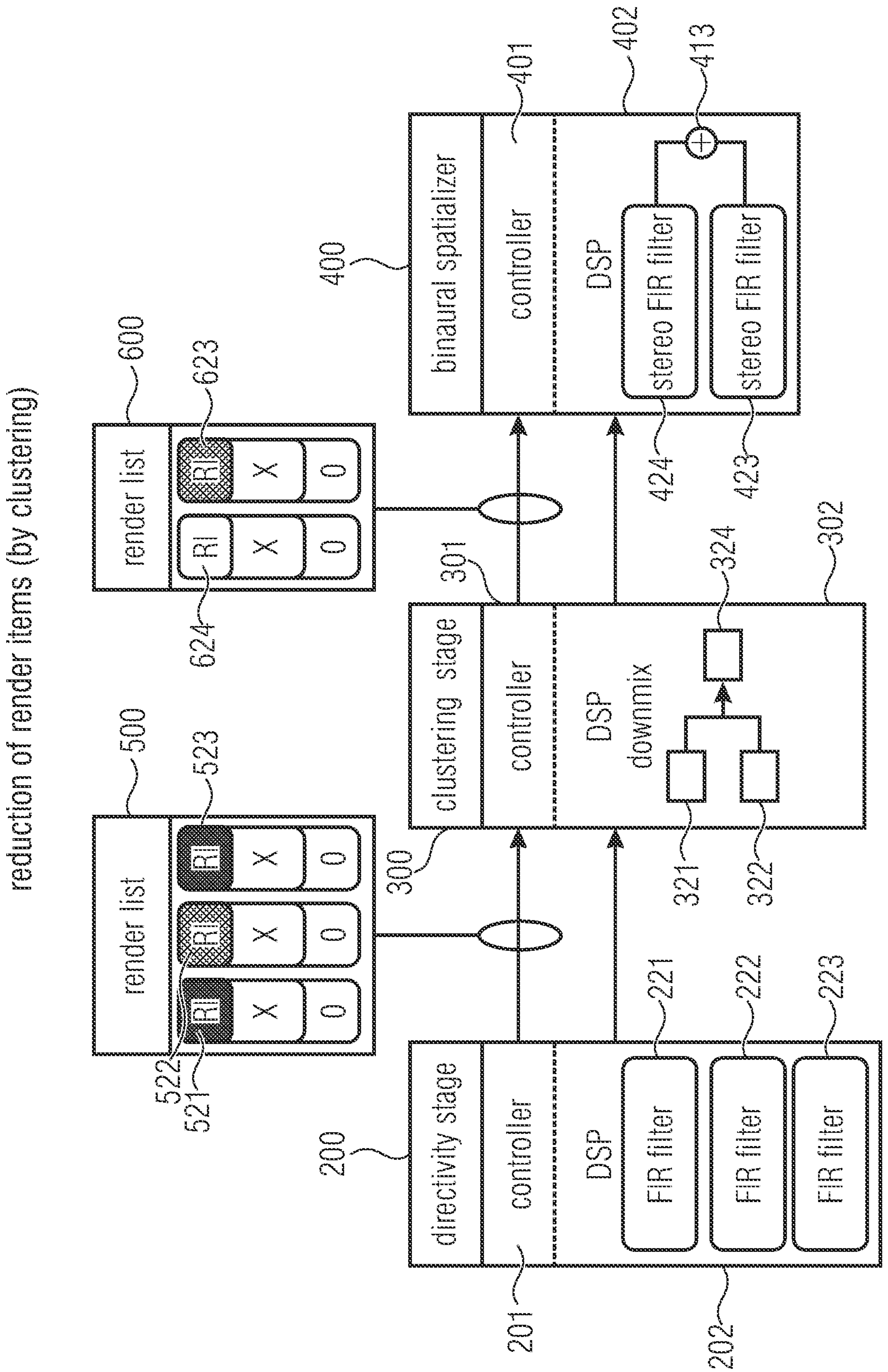
FIG. 7 illustrates another example for the reduction of render items, for example by clustering.
Figure 8:
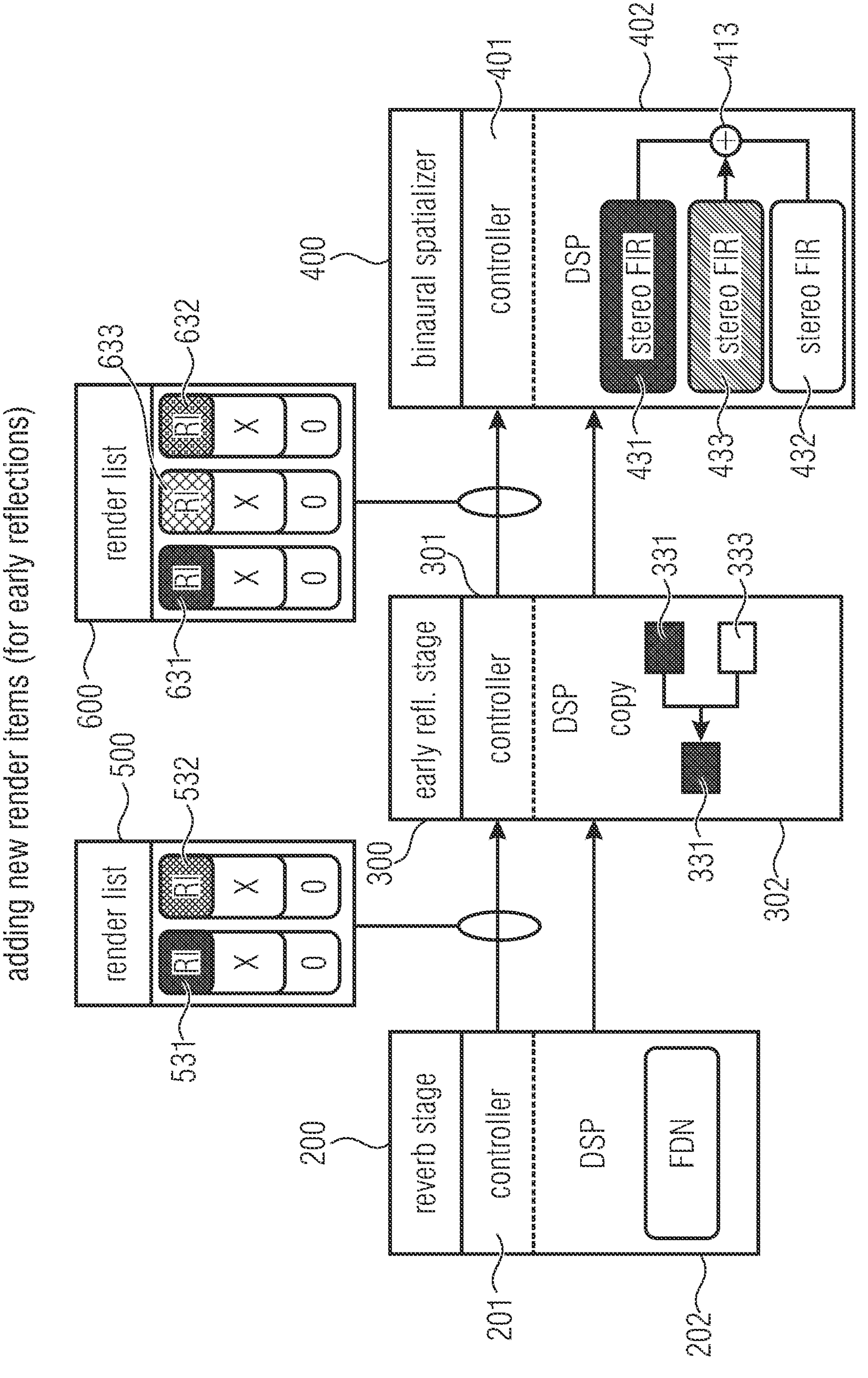
FIG. 8 illustrates another example implementation for adding new render items such as for early reflections.

Subsequently, FIGS. 6, 7 and 8 are illustrated and discussed in order to give certain examples for how the pipeline stages can be configured and how the pipeline stages can be reconfigured.

FIG. 6 illustrates the procedure of changing meta data for existing render items.

Scenario

Two object audio sources are represented as two Render Items (RIs). The Directivity Stage is responsible for directional filtering of the sound source signal. The Propagation Stage is responsible for rendering a propagation delay based on the distance to the listener. The Binaural Spatializer is responsible for binauralization and downmixing the scene to a binaural stereo signal.

At a certain control step, the RI positions change with regard to previous control steps, thus requiring changes in the DSP processing of each individual stage. The acoustic scene should update synchronously, so that e.g. the perceptual effect of a changing distance is synchronous with the perceptual effect of a change in the listener-relative angle of incidence.

Implementation

The Render List is propagated through the complete pipeline at each control step. During the control step, the parameters of the DSP processing stay constant for all stages, until the last Stage/Spatializer has processed the new Render List. After that, all Stages change their DSP parameters synchronously at the beginning of the next DSP step.

It is each Stage's responsibility to update the parameters of the DSP processing without noticeable artifacts (e.g. output crossfade for FIR filter updates, linear interpolation for delay lines).

RIs can contain fields for metadata pooling. This way, for example the Directivity stage does not need to filter the signal itself, but can update an EQ field in the RI metadata. A subsequent EQ stage then applies the combined EQ field of all preceding stages to the signal.

Key Advantages

- Guaranteed atomicity of scene changes (both across Stages and across RIs)
- Larger DSP reconfigurations do not block the audio processing and are synchronously executed when all Stages/Spatializers are ready
- With clearly defined responsibilities, other Stages of the pipeline are independent of the algorithm used for a specific task (e.g. the method or even availability of clustering)
- Metadata pooling allows many Stages (Directivity, Occlusion, etc.) to operate only in the control step.

Particularly, the input render list is the same as the output render list 500 in the FIG. 6 example. Particularly, the render list has a first render item 511 and a second render item 512 where each render item has a single audio stream buffer.

In the first render or pipeline stage 200 which is the directivity stage in this example, a first FIR filter 211 is applied to the first render item and another directivity filter or FIR filter 212 is applied to the second render item 512. Furthermore, within the second render stage or second pipeline stage 33, which is the propagation stage in this embodiment, a first interpolating delay line 311 is applied to the first render item 511, and another second interpolating delay line 312 is applied to the second render item 512.

Furthermore, in the third pipeline stage 400 connected subsequent to the second pipeline stage 300, a first stereo FIR filter 411 for the first render item 511 is used, and a second FIR filter 412 or the second render item 512 is used. In the binaural specializer, a downmix of the two filter output data is performed in the adder 413 in order to have the binaural output signal. Thus, the two object signals indicated by the render items 511, 512, binaural signal at the output of the adder 413 (not illustrated in FIG. 6) is generated. Thus, as discussed, all the elements 211, 212, 311, 312, 411, 412 are changed in response to the switch control at the same certain time instant under the control of the control layer 201, 301, 401. FIG. 6 illustrates a situation, where the number of objects indicated in the render list 500 remains the same, but the meta data for the objects have changed due to a different position of the object. Or, alternatively, the meta data for the objects and, particularly, the position of the object has remained the same, but, in view of the listener movement, the relation between the listener and the corresponding (fixed) object has changed resulting in changes of the FIR filters 211, 212, and changes in the delay lines 311, 312, and changes in the FIR filters 411, 412 that are, for example, implemented as head related transfer function filters that change with each change of the source or object position or the listener position as, for example, measured by a head tracker, for example.

FIG. 7 illustrates a further example related to the reduction of render items (by clustering).

Scenario

In a complex auditory scene, the Render List may contain many RIs that are perceptually close-by, i.e. their difference in position cannot be distinguished by the listener. To reduce the computational load for subsequent Stages, a Clustering Stage may replace multiple individual RIs by a single representative RI.

At a certain control step, the scene configuration may change so that the clustering is no longer perceptually feasible. In this case, the Clustering Stage will become inactive and passes the Render List unchanged.

Implementation

When some incoming RIs are clustered, the original RIs are deactivated in the outgoing Render List. The reduction is opaque for subsequent Stages and the Clustering Stage needs to guarantee that as soon as the new outgoing Render List becomes active, valid samples are provided in the buffers associated with the representative RI.

When the cluster becomes infeasible, the new outgoing Render List of the Clustering stage contains the original, unclustered RIs. Subsequent stages need to process them individually starting with the next DSP parameter change (e.g. by adding a new FIR filter, delay line, etc. to their DSP diagram).

Key Advantages

- The opaque reduction of RIs reduces the computational load for subsequent stages without explicit reconfiguration
- Due to atomicity of the DSP parameter change, Stages can handle varying numbers of incoming and outgoing RIs without artifacts In the FIG. 7 example, the input render list 500 comprises 3 render item 521, 522, 523, and the output renderer 600 comprises two render items 623, 624.

The first render item 521 comes from an output of the FIR filter 221. The second render item 522 is generated by an output of the FIR filter 222 of the directivity stage, and the third render item 523 is obtained at the output of the FIR filter 223 of the first pipeline stage 200 being the directivity stage. It is to be noted that, when it is outlined that a render item is at the output of a filter, this refers to the audio samples for the audio stream buffer of the corresponding render item.

In the example in FIG. 7, render item 523 remains untouched by the clustering state 300 and becomes output render item 623. However, render item 521 and render item 522 are downmixed into dowmixed render item 324 that occurs in the renderer 600 as output render item 624. The downmixing in the clustering stage 300 is indicated by a place 321 for the first render item 521 and a place 322 for the second render item 522.

Again, the third pipeline stage in FIG. 7 is a binaural spatializer 400 and the render item 624 is processed by the first stereo FIR filter 424, and the render item 623 is processed by the stereo filter FIR filter 423, and the output of both filters is added in adder 413 to give the binaural output.

FIG. 8 illustrates another example illustrating the addition of new render items (for early reflections).

Scenario

In geometric room acoustics, it may be beneficial to model reflected sound as image sources (i.e. two point sources with the same signal and their position mirrored on a reflective surface). If the configuration between listener, source and a reflecting surface in the scene is favorable for reflection, the Early Reflections Stage adds a new RI to its outgoing Render List that represents the image source.

The audibility of image sources typically changes rapidly when the listener moves. The Early Reflections Stage can activate and deactivate the RIs at each control step and subsequent Stages should adjust their DSP processing accordingly.

Implementation

Stages after the Early Reflections Stage can process the reflection RI normally, as the Early Reflections Stage guarantees that the associated audio buffer contains the same samples as the original RI. This way, perceptual effects like propagation delay can be handled for original RIs and reflections alike without explicit reconfiguration. For increased efficiency when the activity status of RIs changes often, the Stages can keep required DSP artifacts (like FIR filter instances) for reuse.

Stages can handle Render Items with certain properties differently. For example, a Render Item created by a Reverb Stage (depicted by item 532 in FIG. 8) may not be processed by the Early Reflections Stage and will only be processed by the Spatializer. In this way, a Render Item can provide the functionality of a downmix bus. In a similar way, a Stage may handle Render Items generated by the Early Reflections Stage with a lower quality DSP algorithm as they are typically less prominent acoustically.

Key Advantages

- Different Render Items can be treated differently based on their properties
- A Stage that creates new Render Items can profit from the processing of subsequent Stages without explicit reconfiguration The render list 500 comprises a first render item 531 and a second render item 532. Each has a single audio stream buffer that can carry mono or a stereo signal, for example.

The first pipeline stage 200 is a reverb stage that has, for example, generated render item 531. The render list 500 additionally has render item 532. In the earlier deflection stage 300, render item 531 and, particularly, the audio samples thereof are represented by an input 331 for a copy operation. The input 331 of the copy operation is copied into the output audio stream buffer 331 corresponding to the audio stream buffer of render item 631 of the output render list 600. Furthermore, the other copied audio object 333 corresponds to the render item 633. Furthermore, as stated, render item 532 of the input render list 500 is simply copied or fed through to the render item 632 of the output render list.

Then, in the third pipeline stage that is, in the above example, binaural spatializer, the stereo FIR filter 431 is applied to the first render item 631, the stereo FIR filter 433 is applied to the second render item 633, and the third stereo FIR filter 432 is applied to the third render item 632. Then, the contributions of all three filters are correspondingly added, i.e., channel-by-channel by the adder 413 and the output of the adder 413 are a left signal on the one hand and a right signal on the other hand for a headphone or, generally, for a binaural reproduction.

Figure 9:
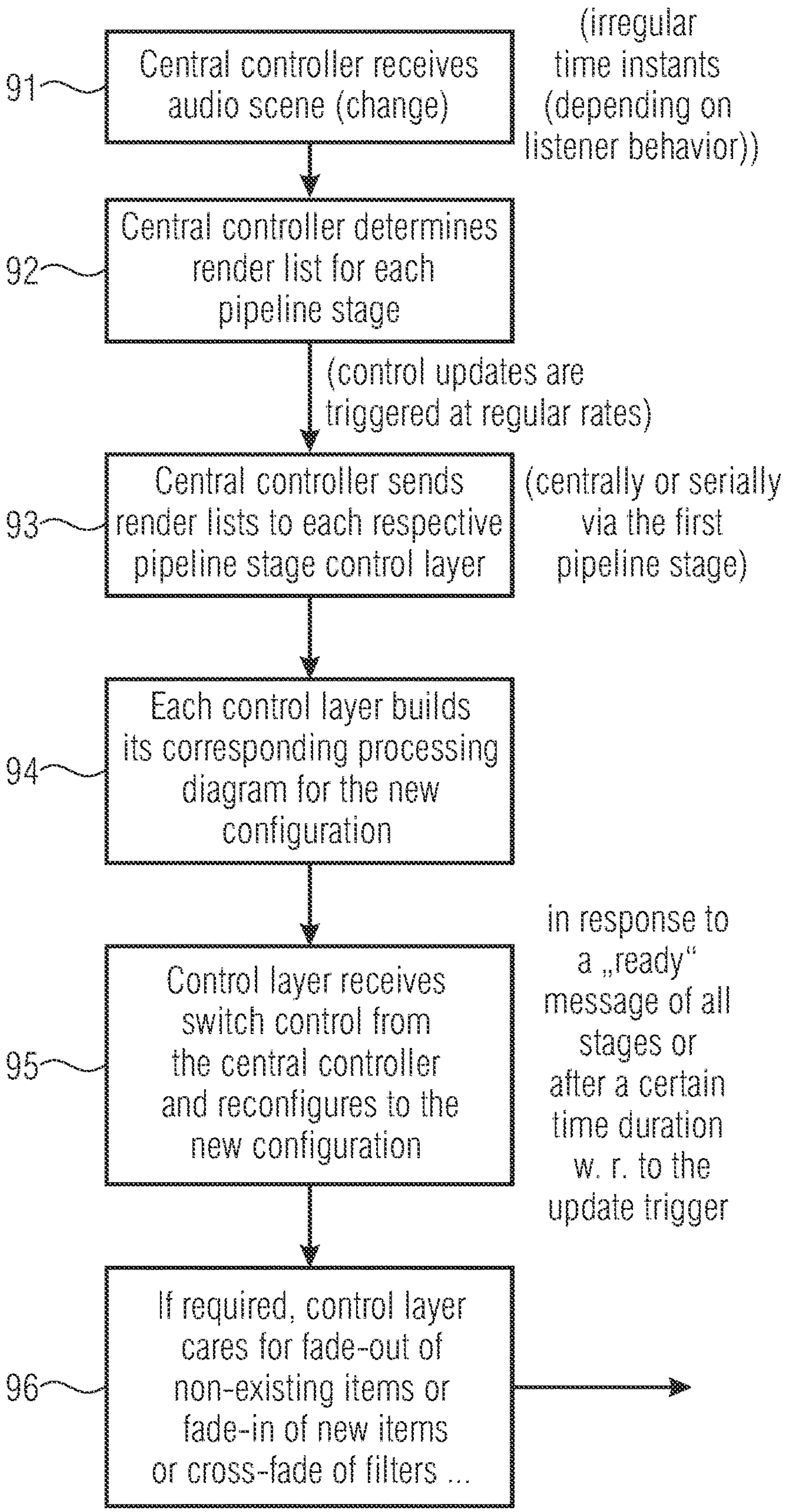
FIG. 9 illustrates a flow chart for illustrating a control flow from a high level event being an audio scene (change) to a low level fade-in or fade-out of old or new items or a cross fade of filters or parameters.

FIG. 9 illustrates an overview of the individual control procedures from a high level control by an audio scene interface of the central controller until a low level control performed by the control layer of a pipeline stage.

At certain instants that may be time instants that are irregular and depend on a listener behavior, as, for example, determined by a head tracker, a central controller receives an audio scene or an audio scene change as indicated by step 91. In step 92, the central controller determines a render list for each pipeline stage under the control of the central controller. Particularly, the control updates that are then sent from the central controller to the individual pipeline stages are triggered at regular rates, i.e., with a certain update rate or update frequency.

As illustrated in step 93, the central controller sends the individual render list to each respective pipeline stage control layer. This can be done centrally via the switch control infrastructure, for example, but it is advantageous to perform this serially via the first pipeline stage and from there to the next pipeline stage and so on as indicated by the control workflow line 130 of FIG. 3. In a further step 94, each control layer builds its corresponding processing diagram for the new configuration for the corresponding reconfigurable audio data processor as illustrated in step 94. The old configuration is also indicated to be the "first configuration", and the new configuration is indicated to be the "second configuration".

In step 95, the control layer receives the switch control from the central controller and reconfigures its associated reconfigurable audio data processor to the new configuration. This control layer switch control reception in step 95 can take place in response to a reception of a ready message of all pipeline stages by the central controller or can be done in response to a sending out of the central controller of the corresponding switch control instruction after a certain time duration with respect to the update trigger as done in step 93. Then, in step 96, the control layer of the corresponding pipeline stage cares for the fade-out of items that do not exist in the new configuration or cares for the fade-in of new items that have not existed in the old configuration. In case of the same objects in the old configuration and the new configuration, and in case of meta data changes such as with respect to the distance to a source or a new HRTF filter due to a movement of the listener's head and so on, a cross-fade of filters or a cross-fade of filtered data in order to smoothly come from one distance, for example, to the other distance is also controlled by the control layer in step 96.

The actual processing in the new configuration is started via a call back from the audio hardware. Thus, in other words, the processing workflow is triggered subsequent to the reconfiguration to the new configuration in a advantageous embodiment. When a new block of samples is requested, the central controller fills the audio stream buffers of the render items it maintains with input samples such as from a disc or from incoming audio streams. The controller then triggers the process part of the render stages, i.e., the reconfigurable audio data processors sequentially, and the reconfigurable audio data processors act on the audio stream buffers according to their current configuration, i.e., to their current processing diagrams. Thus, the central controller fills the audio stream buffers of the first pipeline stage in the apparatus for rendering a sound scene. However, there will also be the situation, where input buffers of other pipeline stages are to be filled from the central controller. This situation can, for example, arise when there have not been spatially extended sound sources in earlier situations of the audio scene. Thus, in this earlier situation, stage 300 of FIG. 4 was not present. Then, however, the listener has moved to a certain place in the virtual audio scene where a spatially extended sound source is visible or has to be rendered as a spatially extended sound source since the listener is quite close to this sound source. Then, at this point in time, in order to introduce this spatially extended sound source via block 300, the central controller 100 will feed, typically via the transmission stage 200, the new render list for the extend render stage 300.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Wenzel, E. M., Miller, J. D., and Abel, J. S. "Sound Lab: A real-time, software-based system for the study of spatial hearing." Audio Engineering Society Convention 108. Audio Engineering Society, 2000.

[2] Tsingos, N., Gallo, E., and Drettakis, G "Perceptual audio rendering of complex virtual environments." ACM Transactions on Graphics (TOG) 23.3 (2004): 249-258.

The invention claimed is:

1. An apparatus for rendering a sound scene, comprising:

a first pipeline stage comprising a first control layer and a reconfigurable first audio data processor, wherein the reconfigurable first audio data processor is implemented as a first digital signal processor (DSP) having a first input buffer and a first output buffer and is configured to operate in accordance with a first configuration of the reconfigurable first audio data processor;

a second pipeline stage located, with respect to a pipeline flow, subsequent to the first pipeline stage, the second pipeline stage comprising a second control layer and a reconfigurable second audio data processor, wherein the reconfigurable second audio data processor is implemented as a second digital signal processor (DSP) having a second input buffer and a second output buffer and is configured to operate in accordance with a first configuration of the reconfigurable second audio data processor; and a central controller for controlling the first control layer and the second control layer in response to the sound scene, so that the first control layer prepares a second configuration of the reconfigurable first audio data processor during or subsequent to an operation of the reconfigurable first audio data processor in the first configuration of the reconfigurable first audio data processor, and so that the second control layer prepares a second configuration of the reconfigurable second audio data processor during or subsequent to an operation of the reconfigurable second audio data processor in the first configuration of the reconfigurable second audio data processor, and wherein the central controller is configured to control the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant, wherein the central controller is configured to receive changes to the sound scene at change time instants in accordance with an interaction workflow, wherein the central controller is configured to provide control instructions to the first and the second control layers in accordance with a control workflow, and wherein the first digital signal processor and the second digital signal processor operate in accordance with a processing workflow, wherein the first control layer is configured to create a first processing diagram representing the second configuration of the reconfigurable first audio data processor from information in render items for the first pipeline stage provided in the control workflow, the processing diagram describing necessary DSP steps for the first digital signal processor, the first input buffer and the first output buffer, wherein the second control layer is configured to create a second processing diagram representing the second configuration of the reconfigurable second audio data processor from information in render items for the second pipeline stage provided in the control workflow, the processing diagram describing necessary DSP steps for the second digital signal processor, the second input buffer and the second output buffer, wherein the first and second processing diagrams are lined up in the first pipeline stage and the second pipeline stage for synchronization, and wherein the processing diagrams are handed over to the processing workflow simultaneously for the first pipeline stage and the second pipeline stage after a control update from the control workflow is propagated through the apparatus for rendering the sound scene and in response to a trigger by the switch control provided by the central controller.

2. The apparatus of claim 1, wherein the central controller is configured for controlling the first control layer to prepare the second configuration of the reconfigurable first audio data processor during the operation of the reconfigurable first audio data processor in the first configuration of the reconfigurable first audio data processor, and for controlling the second control layer to prepare the second configuration of the reconfigurable second audio data processor during the operation of the reconfigurable second audio data processor in the first configuration of the reconfigurable second audio data processor, and for controlling the first control layer and the second control layer using the switch control to reconfigure the reconfigurable first audio data processor to the second configuration for the reconfigurable first audio data processor and to reconfigure the reconfigurable second audio data processor to the second configuration for the reconfigurable second audio data processor at the certain time instant.

3. The apparatus of claim 1, wherein the first pipeline stage or the second pipeline stage comprises an input interface configured for receiving an input render list, wherein the input render list comprises an input list of the render items of the input list of render items, meta data for each render item and an audio stream buffer for each render item of the input list of render items, wherein at least the first pipeline stage comprises an output interface configured for outputting an output render list, where the output render list comprises an output list of render items, meta data for each render item of the output list of render items and an audio stream buffer for each render item of the output list of render items, and wherein, when the second pipeline stage is connected to the first pipeline stage, the output render list of the first pipeline stage is the input render list for the second pipeline stage.

4. The apparatus of claim 3, wherein the first pipeline stage is configured to write audio samples into an audio stream buffer indicated by the output render list, so that the second pipeline stage succeeding the first pipeline stage is able to retrieve the audio samples from the audio stream buffer at the processing rate.

5. The apparatus of claim 3, wherein the central controller is configured to provide the input render list or the output render list to the first pipeline stage or the second pipeline stage, wherein the first or the second configuration of the reconfigurable first audio data processor or the reconfigurable second audio data processor comprises a processing diagram, wherein the first control layer or the second control layer is configured to create the processing diagram for the second configuration from the input render list or the output render list received from the central controller or from a preceding pipeline stage, wherein the processing diagram comprises audio data processor steps and references to the first or second input and output buffers of the reconfigurable first audio data processor or the reconfigurable second audio data processor.

6. The apparatus of claim 5, wherein the central controller is configured to provide additional data necessary for creating the processing diagram to the first pipeline stage or the second pipeline stage, wherein the additional data is provided by the central controller.

7. The apparatus of claim 3, wherein the first pipeline stage or the second pipeline stage is configured to create the output render list from the input render, wherein the creating comprises changing meta data for the render items of the input list and writing changed meta data in the output list, or comprises calculating output audio data for the render items using input audio data retrieved from an input stream buffer of the input render list and writing the output audio data into an output stream buffer of the output render list.

8. The apparatus of claim 3, where each render item of the list of render items of the input render list or an the output render list of the first pipeline stage or the second pipeline stage includes a state indicator indicating at least one of the following states: rendering is active, rendering is to be activated, rendering is inactive, rendering is to be deactivated.

9. The apparatus of claim 3, wherein the first pipeline stage is a directivity stage, and the second pipeline stage is a clustering stage, wherein the central controller is configured to receive a change of the sound scene indicating that a clustering of the render items is to be stopped, and wherein the central controller is configured to control the first control layer to deactivate the reconfigurable second audio data processor of the clustering stage, and to copy the input render list into the output render list of the second pipeline stage.

10. The apparatus of claim 1, wherein the central controller is configured to receive a sound scene change via a sound scene interface at a sound scene change time instant, wherein the central controller is configured to generate a first render list for the first pipeline stage, and a second render list for the second pipeline stage in response to the sound scene change and based on a current sound scene defined by the sound scene change, and wherein the central controller is configured to send the first render list for the first pipeline stage to the first control layer and the second render list for the second pipeline stage to the second control layer subsequent to the sound scene change time instant.

11. The apparatus of claim 10, wherein first reconfigurable first audio data processor from the first render list subsequent to the sound scene change time instant, and wherein the second control layer is configured to calculate the second configuration of the reconfigurable second audio data processor from the second render list, and wherein the central controller is configured to trigger the switch control simultaneously for the first and the second pipeline stages.

12. The apparatus of claim 1, wherein the central controller is configured to use the switch control without interfering with an audio sample calculation operation as performed by the reconfigurable first audio data processor and the reconfigurable second audio data processor.

13. The apparatus of claim 1, wherein the interaction workflow has an irregular data rate, wherein the control workflow has a regular control rate, and wherein the processing rate is an audio block rate, wherein the processing workflow comprises calculating output audio samples from input audio samples received from the first input buffer of the first digital signal processor or the second input buffer of the second digital signal processor, wherein the output audio samples are stored in the first output buffer of the first digital signal processor or the second digital signal processor, and wherein the regular control rate is lower than the audio block rate.

14. The apparatus of claim 1, wherein the central controller is configured to trigger the switch control at a certain time period subsequent to controlling the first and the second control layers to prepare the second configuration, or in response to a ready signal received from the first and the second pipeline stages indicating that the first and the second pipeline stages are ready for a change to the second configuration.

15. The apparatus of claim 1, wherein the first control layer or the second control layer is configured to control the reconfigurable first audio data processor or the reconfigurable second audio data processor to fade in a new render item to be processed subsequent to the switch control or to fade out an old render item not existing anymore subsequent to the switch control, but existing before the switch control.

16. The apparatus of claim 1, wherein the central controller is configured to fill, in response to a request from the first pipeline stage or the second pipeline stage, input buffers of render items maintained by the central controller with new audio samples, and wherein the central controller is configured to trigger the reconfigurable first audio data processor and the reconfigurable second audio data processor sequentially, so that the reconfigurable first audio data processor and the reconfigurable second audio data processor act on input buffers of the render items in accordance with the first configuration or the second configuration depending on which configuration is currently active.

17. The apparatus of claim 1, wherein the second pipeline stage is a spatializer stage that provides, as an output, a channel representation for a headphone reproduction or a loudspeaker set up.

18. The apparatus of claim 1, wherein the first and the second pipeline stages comprise at least one of the following groups of stages:

a transmission stage, an extent stage, an early reflection stage, a clustering stage, a diffraction stage, a propagation stage, a spatializer stage, a limiter stage, and a visualization stage.

19. The apparatus of claim 1, wherein the first pipeline stage is a directivity stage for one or more render items, and wherein the second pipeline stage is a propagation stage for one or more render items, wherein the central controller is configured to receive a change of the sound scene indicating that the one or more render items have one or more new positions, wherein the central controller is configured to control the first control layer and the second control layer to adapt filter settings for the reconfigurable first audio data processor and the reconfigurable second audio data processors to the one or more new positions, and wherein the first control layer or the second control layer are configured to change to the second configuration at the certain time instant, wherein, when changing to the second configuration, a crossfade operation from the first configuration to the second configuration is performed by the first control layer or the second control layer.

20. The apparatus of claim 3, wherein the first pipeline stage is a reverb stage, and wherein the second pipeline stage is an early reflections stage, wherein the central controller is configured to receive a change of the audio scene indicating that an additional image source is to be added, and wherein the central controller is configured to control the control layer of the second pipeline stage to multiply a render item from the input render list to acquire a multiplied render item, and to add the multiplied render item to the output render list of the second pipeline stage.

21. A method of rendering a sound scene using an apparatus comprising a first pipeline stage comprising a first control layer and a reconfigurable first audio data processor, wherein the reconfigurable first audio data processor is configured to operate in accordance with a first configuration of the reconfigurable first audio data processor; a second pipeline stage located, with respect to a pipeline flow, subsequent to the first pipeline stage, the second pipeline stage comprising a second control layer and a reconfigurable second audio data processor, wherein the reconfigurable second audio data processor is configured to operate in accordance with a first configuration of the reconfigurable second audio data processor, the method comprising:

controlling the first control layer and the second control layer in response to the sound scene, so that the first control layer prepares a second configuration of the reconfigurable first audio data processor being implemented as a first digital signal processor (DSP) having a first input buffer and a first output buffer during or subsequent to an operation of the reconfigurable first audio data processor in the first configuration of the reconfigurable first audio data processor, and so that the second control layer prepares a second configuration of the reconfigurable second audio data processor being implemented as a second digital signal processor (DSP) having a second input buffer and a second output buffer during or subsequent to an operation of the reconfigurable second audio data processor in the first configuration of the reconfigurable second audio data processor, and controlling the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant, wherein controlling comprises receiving changes to the sound scene at change time instants in accordance with an interaction workflow, wherein the controlling comprises providing control instructions to the first and the second control layers in accordance with a control workflow, and wherein the first digital signal processor and the second digital signal processor operate in accordance with a processing workflow, wherein the first control layer is configured to create a first processing diagram representing the second configuration of the reconfigurable first audio data processor from information in render items for the first pipeline stage provided in the control workflow, the processing diagram describing necessary DSP steps for the first digital signal processor, the first input buffer and the first output buffer, wherein the second control layer is configured to create a second processing diagram representing the second configuration of the reconfigurable second audio data processor from information in render items for the second pipeline stage provided in the control workflow, the processing diagram describing necessary DSP steps for the second digital signal processor, the second input buffer and the second output buffer, wherein the first and second processing diagrams are lined up in the first pipeline stage and the second pipeline stage for synchronization, and wherein the processing diagrams are handed over to the processing workflow simultaneously for the first pipeline stage and the second pipeline stage after a control update from the control workflow is propagated through the apparatus and in response to a trigger by the switch control provided by the controlling.

22. A non-transitory digital storage medium having a computer program stored thereon to perform, when the computer program is run by a computer, a method of rendering a sound scene using an apparatus comprising a first pipeline stage comprising a first control layer and a reconfigurable first audio data processor, wherein the reconfigurable first audio data processor is configured to operate in accordance with a first configuration of the reconfigurable first audio data processor; a second pipeline stage located, with respect to a pipeline flow, subsequent to the first pipeline stage, the second pipeline stage comprising a second control layer and a reconfigurable second audio data processor, wherein the reconfigurable second audio data processor is configured to operate in accordance with a first configuration of the reconfigurable second audio data processor, the method comprising:

controlling the first control layer and the second control layer in response to the sound scene, so that the first control layer prepares a second configuration of the reconfigurable first audio data processor being implemented as a first digital signal processor (DSP) having a first input buffer and a first output buffer during or subsequent to an operation of the reconfigurable first audio data processor in the first configuration of the reconfigurable first audio data processor, and so that the second control layer prepares a second configuration of the reconfigurable second audio data processor being implemented as a second digital signal processor (DSP) having a second input buffer and a second output buffer during or subsequent to an operation of the reconfigurable second audio data processor in the first configuration of the reconfigurable second audio data processor, and controlling the first control layer or the second control layer using a switch control to reconfigure the reconfigurable first audio data processor to the second configuration for the reconfigurable first audio data processor or to reconfigure the reconfigurable second audio data processor to the second configuration for the reconfigurable second audio data processor at a certain time instant, wherein controlling comprises receiving changes to the sound scene at change time instants in accordance with an interaction workflow, wherein the controlling comprises providing control instructions to the first and the second control layers in accordance with a control workflow, and wherein the first digital signal processor and the second digital signal processor operate in accordance with a processing workflow, wherein the first control layer is configured to create a first processing diagram representing the second configuration of the reconfigurable first audio data processor from information in render items for the first pipeline stage provided in the control workflow, the processing diagram describing necessary DSP steps for the first digital signal processor, the first input buffer and the first output buffer, wherein the second control layer is configured to create a second processing diagram representing the second configuration of the reconfigurable second audio data processor from information in render items for the second pipeline stage provided in the control workflow, the processing diagram describing necessary DSP steps for the second digital signal processor, the second input buffer and the second output buffer, wherein the first and second processing diagrams are lined up in the first pipeline stage and the second pipeline stage for synchronization, and wherein the processing diagrams are handed over to the processing workflow simultaneously for the first pipeline stage and the second pipeline stage after a control update from the control workflow is propagated through the apparatus and in response to a trigger by the switch control provided by the controlling.

* * * * *